United States Patent
Rosalli et al.

(10) Patent No.: US 11,208,607 B2
(45) Date of Patent: Dec. 28, 2021

(54) SYNTHETIC OLIGOMER COMPOSITIONS AND METHODS OF MANUFACTURE

(71) Applicant: NOVVI LLC, Emeryville, CA (US)

(72) Inventors: Jason Charles Rosalli, Oakland, CA (US); Wui Sum Willbe Ho, Oakland, CA (US); Eduardo Baralt, Houston, TX (US); Jason R. Wells, Fremont, CA (US); Liwenny Ho, Oakland, CA (US); Benton Thomas, Elizabethtown, NC (US)

(73) Assignee: NOVVI LLC, Emeryville, CA (US)

( * ) Notice: Subject to any disclaimer, the term of this patent is extended or adjusted under 35 U.S.C. 154(b) by 0 days.

(21) Appl. No.: 16/347,713

(22) PCT Filed: Nov. 8, 2017

(86) PCT No.: PCT/US2017/060585
§ 371 (c)(1),
(2) Date: May 6, 2019

(87) PCT Pub. No.: WO2018/089457
PCT Pub. Date: May 17, 2018

(65) Prior Publication Data
US 2019/0264122 A1 Aug. 29, 2019

Related U.S. Application Data

(60) Provisional application No. 62/419,808, filed on Nov. 9, 2016.

(51) Int. Cl.
*C10M 107/10* (2006.01)
*C10M 177/00* (2006.01)
(Continued)

(52) U.S. Cl.
CPC .......... *C10M 107/10* (2013.01); *C08F 10/14* (2013.01); *C10M 143/08* (2013.01);
(Continued)

(58) Field of Classification Search
CPC .............. C10M 107/10; C10M 143/08; C10M 177/00; C10M 2205/028;
(Continued)

(56) References Cited

U.S. PATENT DOCUMENTS

| 4,284,522 A | 8/1981 | Olmsted |
| 5,105,039 A | 4/1992 | Pelrine |

(Continued)

FOREIGN PATENT DOCUMENTS

| EP | 1969607 B1 | 3/2010 |
| EP | 2222823 | 9/2010 |

(Continued)

OTHER PUBLICATIONS

Patent Cooperation Treaty, International Search Report for PCT/US2017/060585, 4 pages Feb. 19, 2018.

(Continued)

*Primary Examiner* — Taiwo Oladapo
(74) *Attorney, Agent, or Firm* — Bryan Cave Leighton Paisner LLP

(57) ABSTRACT

A polyalphaolefin composition is provided comprising trimers of C12 alpha-olefins and dimers of C14 alpha-olefins, where the ratio by weight of C12 trimer to C14 dimer is within a range of 4:1 by weight to 1:4 by weight, where the C12 trimer enriched polyalphaolefin has an average branching ratio <0.2 and the C14 dimer has an average branching ratio of >0.20, and where the average branching ratio for all C12 trimers and C14 dimers is between 0.19 and 0.26. The composition has a boiling point distribution where less than 30% by weight of the composition has a boiling point (Continued)

Embodiment of Process for Forming PAO Composition

Alternate Embodiment of Process for Forming PAO Composition between 420° C. and 455° C., and the resulting base oil has a kinematic viscosity of about 3.3 to 4.7 cSt at 100° C.

24 Claims, 3 Drawing Sheets

(51) Int. Cl.

| | | |
|---|---|---|
| *C08F 10/14* | (2006.01) | |
| *C10M 143/08* | (2006.01) | |
| *C10N 20/02* | (2006.01) | |
| *C10N 20/00* | (2006.01) | |
| *C10N 30/02* | (2006.01) | |
| *C10N 30/08* | (2006.01) | |
| *C10N 30/00* | (2006.01) | |
| *C10N 40/25* | (2006.01) | |
| *C10N 60/02* | (2006.01) | |
| *C10N 70/00* | (2006.01) | |

(52) U.S. Cl.
CPC .... *C10M 177/00* (2013.01); *C10M 2205/028* (2013.01); *C10M 2205/0285* (2013.01); *C10N 2020/011* (2020.05); *C10N 2020/015* (2020.05); *C10N 2020/02* (2013.01); *C10N 2020/069* (2020.05); *C10N 2020/071* (2020.05); *C10N 2030/02* (2013.01); *C10N 2030/08* (2013.01); *C10N 2030/74* (2020.05); *C10N 2040/25* (2013.01); *C10N 2060/02* (2013.01); *C10N 2070/00* (2013.01)

(58) Field of Classification Search
CPC ............ C10M 2205/0285; C08F 10/14; C10N 2020/02; C10N 2020/011; C10N 2020/015; C10N 2020/069; C10N 2020/071; C10N 2030/02; C10N 2030/08; C10N 2030/74; C10N 2040/25; C10N 2060/02; C10N 2070/00; C10G 69/126
See application file for complete search history.

(56) References Cited

U.S. PATENT DOCUMENTS

| | | | |
|---|---|---|---|
| 5,132,477 A | 7/1992 | Ho et al. | |
| 5,264,642 A | 11/1993 | Wu | |
| 5,767,047 A | 6/1998 | Duncan et al. | |
| 5,817,899 A | 10/1998 | Hope et al. | |
| 5,922,658 A | 7/1999 | Duncan et al. | |
| 6,071,863 A * | 6/2000 | Benda ................ | C10M 107/10 508/591 |
| 6,313,077 B1 | 11/2001 | Stunnenberg et al. | |
| 6,398,986 B1 | 6/2002 | McShane | |
| 7,456,329 B2 | 11/2008 | Wu et al. | |
| 7,544,850 B2 | 6/2009 | Goze et al. | |
| 7,652,186 B2 * | 1/2010 | Goze ..................... | C10G 50/02 585/525 |
| 7,691,792 B1 | 4/2010 | Fisher et al. | |
| 7,795,484 B2 | 9/2010 | Koivusalmi | |
| 8,124,820 B2 | 2/2012 | Tiitta et al. | |
| 8,268,199 B1 | 9/2012 | Forest | |
| 9,206,095 B2 | 12/2015 | Bagheri et al. | |
| 9,266,793 B2 | 2/2016 | Gee | |
| 10,501,670 B2 | 12/2019 | Hahn et al. | |
| 2002/0139962 A1 | 10/2002 | Fefer et al. | |
| 2006/0027361 A1 | 2/2006 | Hanson et al. | |
| 2007/0225534 A1 | 9/2007 | Goze et al. | |
| 2007/0259792 A1 | 11/2007 | Null | |
| 2007/0299291 A1 | 12/2007 | Koivusalmi | |
| 2008/0146469 A1 | 6/2008 | Sato et al. | |
| 2008/0283803 A1 | 11/2008 | Rapp | |
| 2009/0036337 A1 | 2/2009 | Deskin et al. | |
| 2009/0137435 A1 | 5/2009 | Hilker | |
| 2009/0181871 A1 | 7/2009 | Shah et al. | |
| 2009/0326296 A1 | 12/2009 | Brillantes et al. | |
| 2010/0048438 A1 | 2/2010 | Carey et al. | |
| 2010/0059725 A1 | 3/2010 | Sinclair et al. | |
| 2010/0152072 A1 | 6/2010 | Nelson et al. | |
| 2011/0195884 A1 | 8/2011 | Crouthamel et al. | |
| 2011/0287988 A1 | 11/2011 | Fisher et al. | |
| 2011/0288256 A1 | 11/2011 | Vermeiren | |
| 2011/0306529 A1 | 12/2011 | Schober et al. | |
| 2012/0071367 A1 | 3/2012 | Falana et al. | |
| 2012/0119862 A1 | 5/2012 | Franklin et al. | |
| 2012/0209039 A1 | 8/2012 | Wright | |
| 2012/0323055 A1 | 12/2012 | Gruber et al. | |
| 2013/0090273 A1 | 4/2013 | Martin et al. | |
| 2013/0217606 A1 | 8/2013 | Wang et al. | |
| 2013/0253244 A1 | 9/2013 | Emett et al. | |
| 2013/0267450 A1 | 10/2013 | Patil et al. | |
| 2014/0194333 A1 | 7/2014 | Dance et al. | |
| 2014/0323665 A1 | 10/2014 | Wu et al. | |
| 2015/0322365 A1 | 11/2015 | Jeon et al. | |
| 2016/0264493 A1 | 9/2016 | Small et al. | |
| 2017/0121630 A1 | 5/2017 | Vettel et al. | |
| 2017/0130161 A1 | 5/2017 | Vettel et al. | |
| 2017/0240832 A1 | 8/2017 | Hahn et al. | |
| 2017/0305819 A1 | 10/2017 | Wells et al. | |
| 2018/0119033 A1 | 5/2018 | Tirmizi et al. | |
| 2019/0264112 A1 | 8/2019 | Tirmizi et al. | |
| 2019/0264122 A1 | 8/2019 | Rosalli et al. | |
| 2020/0165538 A1 | 5/2020 | Baralt et al. | |
| 2020/0216772 A1 | 7/2020 | Baralt et al. | |

FOREIGN PATENT DOCUMENTS

| | | |
|---|---|---|
| EP | 2236590 | 10/2010 |
| EP | 3052600 | 8/2016 |
| JP | 2008115301 | 5/2008 |
| WO | 9810042 | 3/1998 |
| WO | 0026925 | 5/2000 |
| WO | 03020856 | 3/2003 |
| WO | 2007140339 | 12/2007 |
| WO | 2010115097 | 10/2010 |
| WO | 2012141783 | 10/2012 |
| WO | 2012141784 | 10/2012 |
| WO | 2013101414 | 7/2013 |
| WO | 2013130372 | 9/2013 |
| WO | 2014128227 A1 | 8/2014 |
| WO | 2014154802 A1 | 10/2014 |
| WO | 2016182930 | 11/2016 |
| WO | 2019212674 | 11/2019 |

OTHER PUBLICATIONS

Patent Cooperation Treaty, International Search Report for PCT/US15/21018, dated Jul. 3, 2015, 4 pages.
Patent Cooperation Treaty, International Search Report dated Aug. 31, 2015 for PCT/US2015/035651, 5 pages.
Patent Cooperation Treaty, International Search Report for PCT/US15/35656, dated Aug. 31, 2015, 5 pages.
Patent Cooperation Treaty, International Search Report for PCT/US2015/056430, dated Feb. 4, 2016, 5 pages.
Patent Cooperation Treaty, International Search Report for PCT/US2015/055249, dated Feb. 29, 2016, 5 pgs.
Patent Cooperation Treaty, International Search Report for PCT/US2016/031274, dated Aug. 8, 2016, 4 pages dated Aug. 8, 2016.
Smith et al., Vitamin E. XLII. Long Chain Aliphatic Compounds with Recurring "Isoprene" Units, J. Am. Chem. Soc., 1943, 65 (5), pp. 745-750 May 12, 1943.
European Patent Office, Extended European Search Report dated Oct. 20, 2017, 9 pages dated Oct. 20, 2017.
European Patent Office, Extended European Search Report issued for App. No. 15764090.5; Pub. No. 3120368, 6 pages dated Oct. 19, 2017.
Cooper, Tim, Industrial Lubricants 2008, retrieved from energy.org.il/wp-content/uploads/2017/01/nrg510.pdf 2006.
European Patent Office, Extended European Search Report for 15806655.5, 8 pages dated Dec. 19, 2017.

(56) References Cited

OTHER PUBLICATIONS

European Patent Office, Extended European Search Report for Application No. 15851673.2, publication EP 3209630, 11 pages dated Apr. 26, 2018.

Hernaindez-Torres et al., Stereocontrolled generation of the (2R) chroman core of vitamin E: total synthesis of (2R,4'RS,8'RS)-alpha-tocopherol, Organic Letters, 2009, 11(21): 4930-4933 2009.

Sinnenghe Damste et al., The identification of 2,3-dimethyl-5-(2,6,10-trimethylundecyl)thiophene, a novel sulphur containing biological marker, Tetrahedron Letters, 1987, 28(9): 957-960 1987.

Odinokov et al., New Enantiospecific synthesis of (+)-2R,6R)-(+)-2,6,10-Trimethylundecan-1-ol for constructing the side chain of natural (2R,4'5,8'R)-(+)-[alpha]Tocopherol (Vitamin E), Doklady Chemistry, Kluwer Academic Publishers-Plenum Publishers, NE, 2005, 403(4-6): 144-147 2005.

European Patent Office, Extended European Search Report for Application No. 15850492.8, publication EP 3207110, 10 pages dated Apr. 20, 2018.

European Patent Office, European Supplemental Search Report for Application No. 16793265.6, publication EP 3294840, 13 pages dated Oct. 30, 2018.

Patent Cooperation Treaty, International Search Report for PCT/US2018/041981, 6pgs, dated Nov. 26, 2018.

Patent Cooperation Treaty, International Search Report for PCT/US2018/041993, 6pgs, dated Nov. 29, 2018.

Challener, C., Base oils 2014: Green lubricants continue progress, ICIS Chemical Business, retrieved from www.icis.com/resources/news/2014/02/11/9752026/base-oils-2014-green-lubricants-continue-progress/, 8 pages Feb. 11, 2014.

Ineos, Safety Data Sheet DURASYN 125 Polyalphaolefin, 11 pages, retrieved from www.ineos.com/products/?fs=Polyalphaolefin%2b(PAO)%2b-%2bLow%2bViscosity Mar. 5, 2021.

* cited by examiner

SYNTHETIC OLIGOMER COMPOSITIONS AND METHODS OF MANUFACTURE

Aspects of the disclosure generally relate to novel synthetic base oil compositions exhibiting improved lubricant properties, such as low-temperature viscosity and volatility. Polyalpha-olefins (PAOs) make up an important class of hydrocarbon lubricating oils.

PAOs are typically produced by the polymerization of alpha-olefins in the presence of a catalyst such as AlCl3, BF3, or a BF3 complex. For example, ethylene, propylene, 1-octene, 1-decene, 1-dodecene, and 1-tetradecene have been used to manufacture PAOs. Oligomerization of the alpha-olefins is typically followed by fractionation and hydrogenation to remove any remaining unsaturated moieties.

PAOs are commonly categorized by kinematic viscosity (KV) in centistokes (cSt), measured at 100° C. according to ASTM D445. For example, 2 cSt, 2.5 cSt, 4 cSt, 5 cSt, 6 cSt, 7 cSt, 8 cSt, and 9 cSt PAOs comprising various single and combinations of oligomers of 1-decene and 1-dodecene are known. PAOs have been known for over 35 years as high-performance functional lubricating oils that have exceptionally good performance, particularly suited for use in automotive engine oil formulations.

The automotive industry is placing greater demands on engine oils, operating at higher temperatures for longer times and requiring lower viscosity engine oil formulations such as 0W-30 and 0W-20 engine oils which improve vehicle fuel economy by lowering friction losses. This is driving a demand for low viscosity PAOs, such as around 4 cSt kinematic viscosity, while maintaining low Noack volatility and good low-temperature performance properties. Thus, a need exists for low viscosity PAOs which exhibit low Noack volatility (calculated according to ASTM D 5800 Standard Test Method for Evaporation Loss of Lubricating Oils by the Noack Method) and can also have a low cold-crank viscosity (i.e. dynamic viscosity according to ASTM D 5293).

Attempts have been made to overcome the above problems by formulating with non-mineral oil Group III base oils, such as Fischer-Tropsch derived base oils. However, it has been found that in low viscosity formulations such as in 0W-30 and lower engine oils, the use of Fischer-Tropsch base oils may not be enough on their own to provide the low NOACK volatility values desired for such formulations.

Prior efforts to prepare various PAOs that can meet the increasingly stringent performance requirements of modern lubricants and automotive engine oil particularly have favored low viscosity polyalphaolefin base oils derived from 1-decene alpha-olefins, alone or in some blend with other mineral or Fischer-Tropsch derived base oils. However, the polyalphaolefins derived from 1-decene can be prohibitively expensive, due the high cost of 1-decene as a result of its significantly limited availability. Furthermore, new PAOs with improved properties, and methods of manufacture thereof, are also needed.

The properties of a particular grade of PAO are typically dependent on the alpha-olefin feed stock used to make that product. Commercially, some C30 to C36 oligomers of alpha olefins are made from a mixed feed of C8, C10 and C12 alpha-olefin, with 1-decene being incorporated for the purpose of imparting the most desirable properties. In contrast, 4 cSt PAOs made without decene have yielded base oils lacking in one or more important physical properties. Thus, PAOs made from mixed alpha-olefin feeds such as the C28 to C36 oligomers described above may have the advantage that they lower the amount of decene that is needed to impart predetermined properties. However, they still do not completely remove the requirement for providing decene as a part of the oligomer. Furthermore, the process to make these PAOs may also result in the production of significant quantities of cross-oligomers that do not have the desired properties for 4 cSt base oil. Accordingly, narrow distillation cuts must typically be taken to select only the oligomers having the desired properties, resulting in undesirably low yields of functional product.

Accordingly, there remains a need for PAO compositions having properties within commercially acceptable ranges of the viscosity, Noack volatility, and low temperature cold-cranking viscosity, for use in automotive and other applications, as well as a method of manufacturing such improved PAO compositions. Furthermore, there remains a need for PAO compositions having improved properties and methods of manufacture thereof, where the PAO compositions have reduced amounts of 1-decene incorporated therein, and even eliminate the use of 1-decene in the manufacture thereof.

SUMMARY

Provided herein are novel compositions and methods of preparation for a novel polyalphaolefin having excellent Viscosity Index (VI), CCS viscosity, and Noack volatility. According to one aspect, the composition includes a mixture of two polyalphaolefins including a trimer-enriched first polyalphaolefin with a branching ratio, or CH3/CH2 Ratio, of less than 0.2, derived from the oligomerization of a 1-dodecene alpha-olefin feedstock; with a dimer-enriched second oligomer derived from a second oligomerization of 1-tetradecene alpha-olefin feedstock having a branching ratio, or CH3/CH2 Ratio, of greater than 0.2, with the final product having a branching ratio between 0.19 and 0.26. The ratio of 1-tetradecene dimers to 1-dodecene trimers is from 1:0 to 1:4 by weight dimer to trimer. The lubricant mixture has a 100C Kinematic Viscosity between about 3.3 and 4.7 cSt. Less than 30% of the mixture boils between the temperature of 420° C. and 455° C. as calculated by a simulated distillation analysis (ASTM D2887) of the polyalphaolefin.

DETAILED DESCRIPTION

Figure 1:
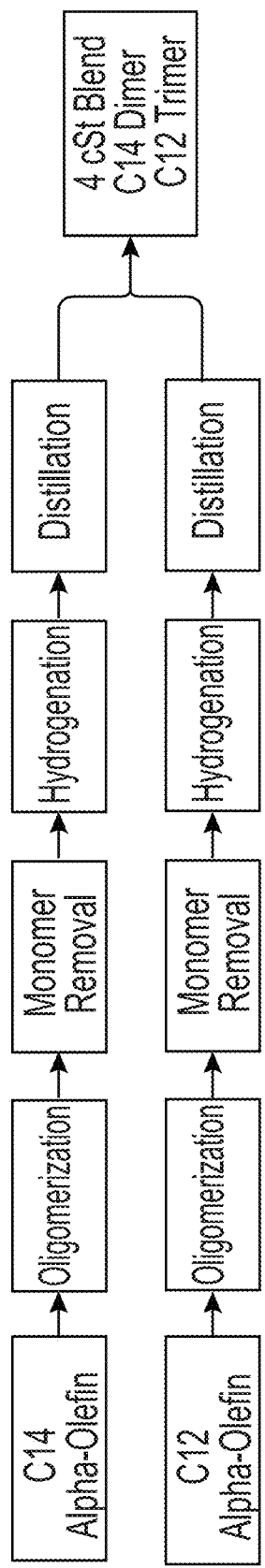
FIG. 1 depicts embodiments of a process for forming a PAO composition from alpha-olefin starting materials, and with oligomerization, hydrogenation and distillation steps, according to aspects of the present disclosure.
Figure 1:
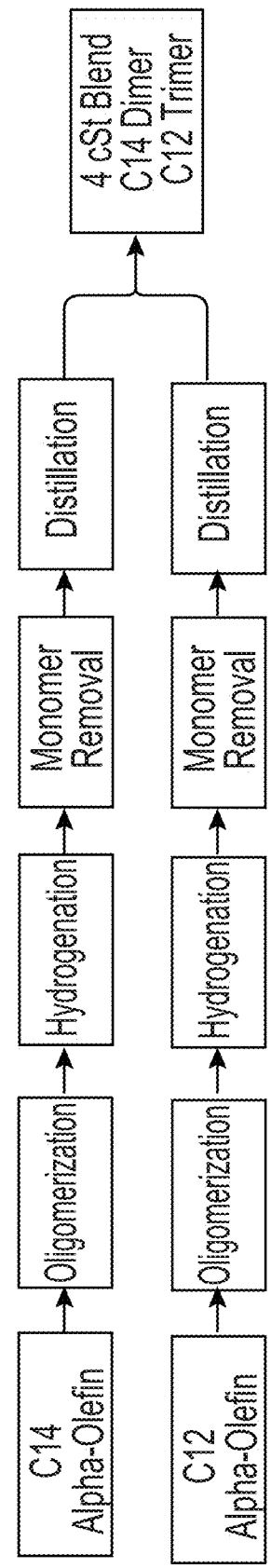

Aspects of the disclosure relate to the surprising discovery that a PAO derived from C12 alpha olefins and C14 alpha olefins can have the desired viscosity, Noack volatility, and low temperature CCS viscosity, such as values of these properties that are within commercially preferred ranges. In particular, according to aspects of the disclosure, by controlling the oligomerization reaction conditions and the degree of branching in the LAO oligomers, a blend of the trimer derived from 1-dodecene and dimer derived from 1-tetradecene can be provided that may be capable of simultaneously offering excellent low temperature performance, high viscosity index and low volatility. According to one aspect, when blended to make a 4 cSt base oil, the physical properties of the composition as claimed may be similar and/or the same as those that have as-yet only been achievable using solely 1-decene or PAOs that incorporate significant amounts of 1-decene as a feedstock, such as PAOs derived from a mixed alpha-olefin feed of C10/C12 or C8/C10/C12 (i.e., cross-oligomers of C10 and C12, and cross-oligomers of C8, C10 and C12).

According to one aspect, the PAO composition comprises a trimer formed from C12 alpha-olefins, mixed with a dimer formed from C14 alpha-olefins. That is, according to one aspect, the composition may be a mixture comprising trimers that have been formed using substantially only a feedstock of C12 alpha-olefins, and dimers that have been formed using substantially only a feedstock of C14 alpha-olefins. For example, a percent content of alpha-olefin other than C12 in the C12 alpha-olefin feedstock may be less than 5%, such as less than 3%, and even less than 1° A, and a percent content of alpha-olefin other than C14 in the C14 alpha-olefin feedstock may be less than 5%, such as less than 3%, and even less than 1%.

Furthermore, according to one aspect, the PAO composition is substantially absent any 1-decene. For example, embodiments of the PAO composition may comprise less than 5% by weight of 1-decene in monomer, dimer or trimer form, as well as higher oligomer forms, such as less than 3% by weight of 1-decene, and even less than 1% by weight of 1-decene. In one embodiment, the PAO composition comprises less than 5% by weight of an oligomer of 1-decene, such as less than 3% by weight, and even less than 1% by weight. In yet another embodiment, the 1-decene may be incorporated into the composition as an oligomer with 1-C12 or 1-C14, or other alpha-olefin, with the amount of such oligomer having a 1-decene monomer not exceeding 30% by weight in the composition, such as less than 20% by weight of the composition, such as less than 10%, such as less than 5%, and even less than 1% by weight of the composition.

Oligomerization Process and Method of Making PAO Composition:

According to one embodiment of a process of forming the PAO composition, in a first step (Step A), a single alpha olefin [e.g., 1-dodecene] is polymerized either by semi-batch or continuous mode in a single stirred tank reactor or by continuous mode in a series of stirred tank reactors using BF3 and/or BF3 promoted with a mixture of linear alcohol and acetate. The reaction mixture is distilled to remove the unreacted monomers and dimers. The resulting product is hydrogenated to saturate the oligomers.

In a second step (Step B), a second alpha olefin [e.g., 1-tetradecene] is also polymerized either by semi-batch or continuous mode in a single stirred tank reactor or by continuous mode in a series of stirred tank reactors using BF3, and/or BF3 promoted with a mixture of normal alcohol and acetate. The reaction mixture is distilled to remove the unreacted monomers. The resulting product is hydrogenated to saturate the oligomers.

According to one embodiment, the oligomers individually obtained from the single alpha-olefins (i.e., 1-dodecene and separately 1-tetradecene) are further individually distilled to obtain a trimer enriched fraction for the first oligomerization and a dimer enriched fraction for the second oligomerization. The two distilled fractions are then combined to make a novel base oil with a bimodal distribution of C12 oligomers and C14 oligomers.

That is, according to one embodiment, the hydrogenated and distilled products from the above steps A and B are blended to make a low viscosity PAO. Depending on the desired viscosity, the PAO composition can be further distilled and/or blended to produce different grades of low viscosity PAO. FIG. 1 illustrates an embodiment of a process for forming a PAO composition, where C14 and C12 alpha-olefin feedstocks are separately oligomerized, and steps of monomer removal, hydrogenation, and dimer distillation are performed, after which the products can be combined to provide a PAO that is a 4 cSt blend of C14 dimer and C12 trimer. In an alternative embodiment as shown in FIG. 1, C14 and C12 alpha-olefin feedstocks are separately oligomerized, and the steps as in the above embodiment are performed including hydrogenation, monomer removal and dimer distillation, with the exception that a hydrogenation process is performed prior to the monomer removal, and the products are combined to provide a PAO that is a 4 cSt blend of C14 dimer and C12 trimer.

In one embodiment according to aspects of the disclosure, blending the individual 1-tetradecene dimer and 1-dodecene trimer distilled products create a low viscosity PAO with a bimodal distribution. As used herein, the term "bimodal distribution" means a narrow molecular weight range of a mixture (blend) of two PAO cuts. Unlike other processes where the LAOs are blended prior to oligomerization to obtain cross-oligomers, it has been discovered that PAO compositions with improved properties can be obtained by oligomerizing the two LAOs separately and combining in a predetermined blend ratio. Specifically, the blend ratio may be a ratio of 1-C12 trimer to 1-C14 dimer that is within a range of from 4:1 by weight to 4:1 by weight, such as from, 3:1 to 1:3, 2:1 to 1:2, and even from 1:1 by weight. In one embodiment, the composition comprises a blend ratio of 0:1, e.g., in a case where C12 trimer is not added to the composition. In one embodiment, the C12 trimer can be provided in the composition in an amount that is within a range of from 20 wt % to 80 wt % of the total composition. In another embodiment, the C14 dimer can be provided in the composition in an amount that is within a range of from 20 wt % to 80 wt %. According to yet another embodiment, the C14 dimer may be provided in a percent by weight such that it comprises substantially the entire composition, such as a percent by weight of C14 dimer that is within a range of from 95% to 100% of the total composition.

In contrast, cross-oligomers are produced by blending monomers prior to oligomerization. For example, mixing 1-tetradecene and 1-dodecene prior to oligomerization will yield the following dimers and trimers (some of the oligomers may generally be around the 4 cSt range).

C12-C12 Dimers (C24)
C12-C14 Dimers (C26)
C14-C14 Dimers (C28)
C12-C12-C12 Trimers (C36)
C12-C12-C14 Trimers (C38)
C12-C14-C14 Trimers (C40)
C14-C14-C14 Trimers (C42)

However, the oligomers lighter than the dimers of 1-C14 (C28) or heavier than the trimers of C1-12 (C36) lack the physical properties to create an ideal 4 cSt base oil. Furthermore, the C24-C26 dimers may exhibit excessively increased volatility, while the heavier trimers (C38-C42) may exhibit excessively increased CCS viscosity and pour point. Furthermore, isomerization in the oligomerization process can make the separation of the desirable dimers from the less desirable dimers more challenging and separation of the desirable trimers from the less desirable trimers more challenging. Thus, the mixing of the LAOs prior to oligomerization may produce a product with a limited range of physical properties and lower yield as compared to the desired properties for oligomers used in low viscosity PAOs. Using a bimodal distribution of the 1-C12 trimers and 1-C14 dimers from separate oligomerizations may thus allow for the base oil to be tailored for a larger range of viscosities with ideal physical properties.

According to one embodiment, the resulting composition exhibits improved physical properties for a PAO at a given viscosity, without requiring that the PAO be derived from 1-decene, or blends of 1-decene with, e.g., 1-octene and 1-dodecene.

Furthermore, embodiments of the PAO composition may be characterized in that the resulting polyalphaolefin has a distinct boiling point distribution. That is, due to the lack of 1-decene, and the lack of 1-dodecene and 1-tetradecene cross oligomers, less than 30%, less than 20%, or even less than 15% of the PAO composition may boil between the temperatures of 420° C. to 455° C. (See, e.g., FIG. 2.) This bimodal boiling point distribution is believed to be unique for a non-1-decene based Polyalphaolefin that exhibits performance properties that are comparable to 1-decene based PAO compositions.

Figure 2:
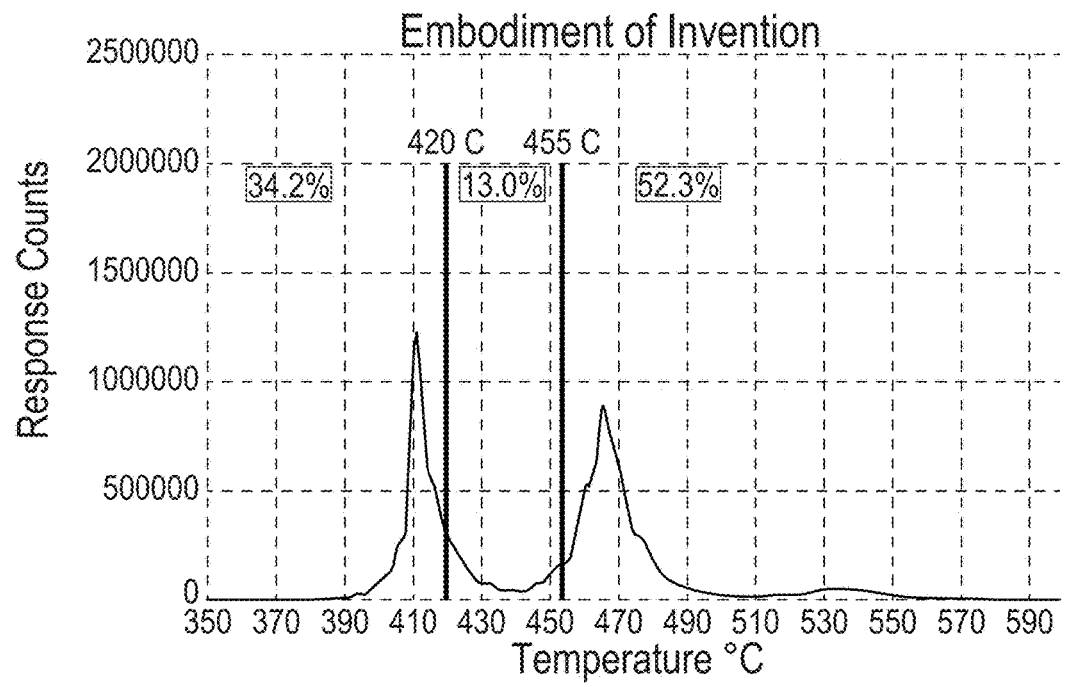
FIG. 2 illustrates a simulated distillation gas chromatograph showing a bimodal boiling point of a PAO composition according to aspects of the present disclosure.

In FIG. 2, a trace from a simulated distillation gas chromatograph (SimDist ASTM D2887), the peak centered at about 415° C. can be understood to be due to the boiling off of 1-Tetradecene dimers from the PAO composition, whereas the peak centered at about 465° C. can be understood to be due to the boiling off of 1-Dodecene trimers from the PAO composition. In other words, as the temperature of the PAO composition is increased from 420° C. to 455° C., less than 30%, less than 20%, or even less than 15%, of the PAO composition is lost due to boiling off, i.e. the composition contains relatively few or even no components (e.g., less than 15% by weight) with a boiling point in the range of from 420° C. to 455° C. In contrast, Polyalphaolefins that use 1-decene as a feedstock and have a viscosity of about 4 cSt have significantly greater than 30% of their oligomers that boil between 420° C. and 455° C. (See, e.g., FIG. 3 and FIG. 4.)

Figure 3:
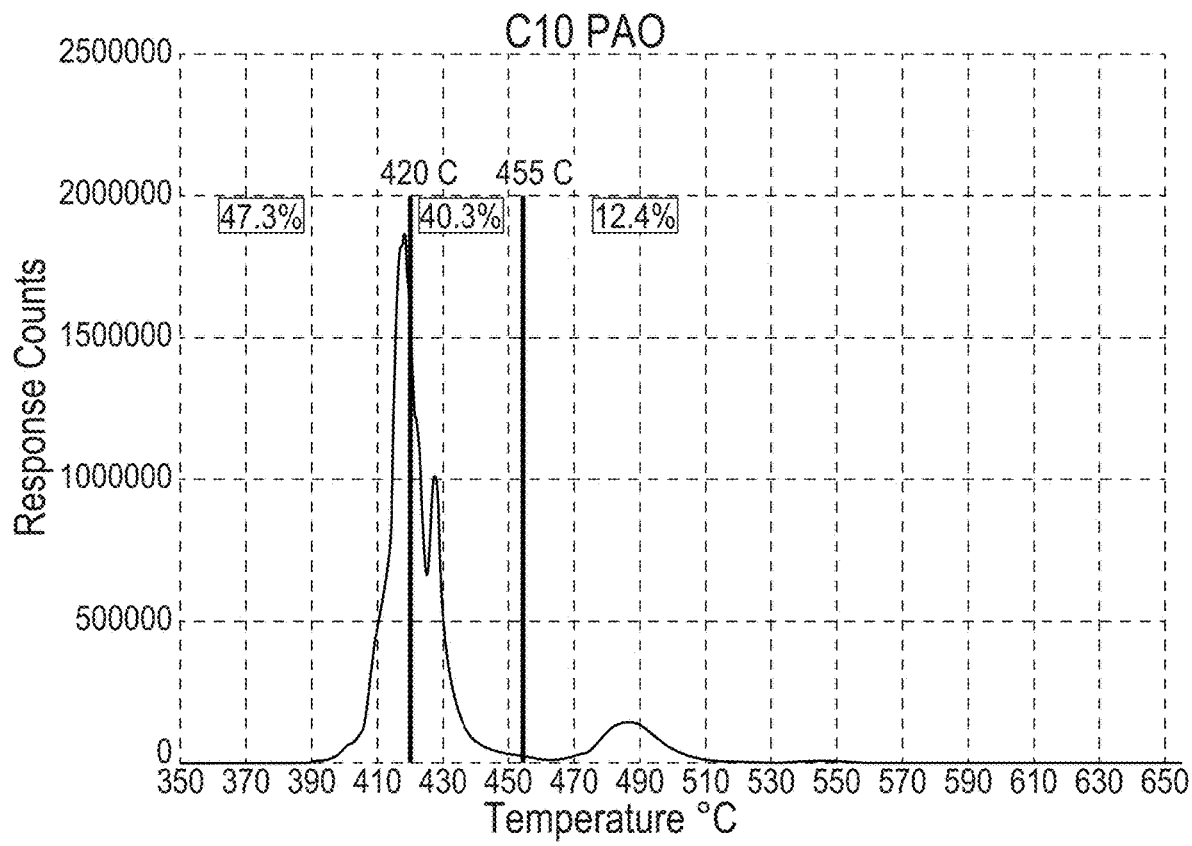
FIG. 3 illustrates a simulated distillation gas chromatograph of a C10 PAO.
Figure 4:
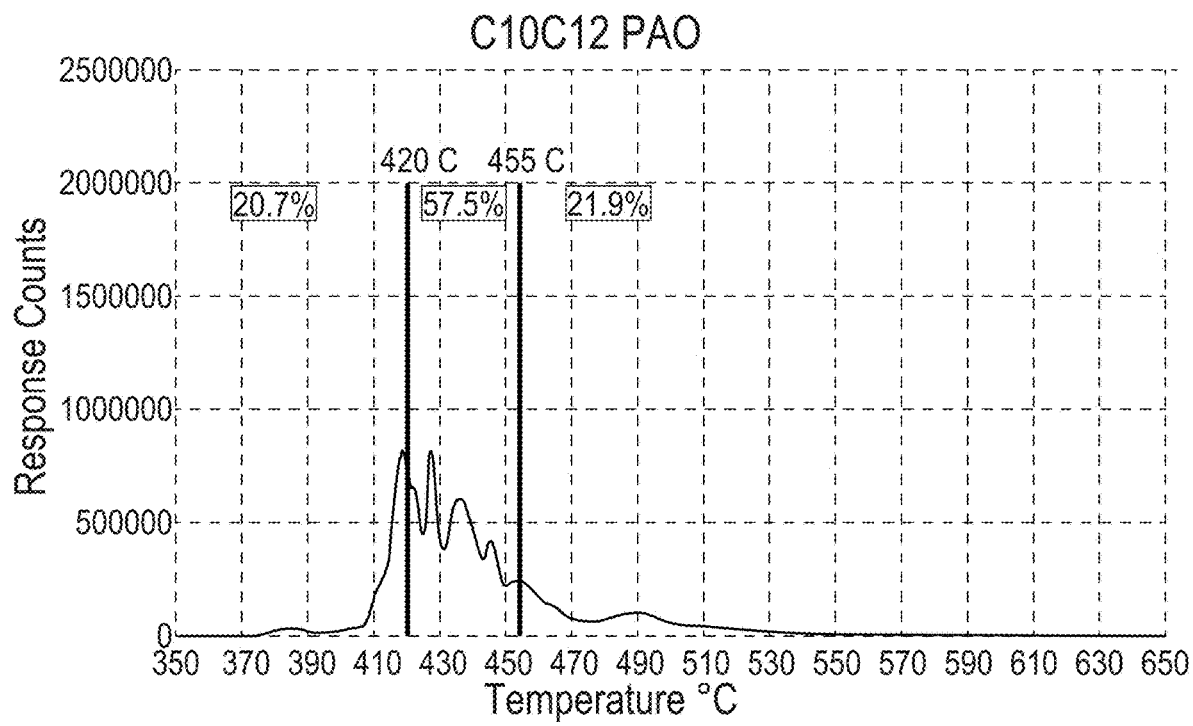
FIG. 4 illustrates a simulated distillation gas chromatograph of a PAO formed from cross oligomers of C10 and C12 with a C30 to C36 carbon range.

FIG. 3 depicts the fraction of material boiling at different temperatures for a PAO composition that is formed only from a 1-decene feedstock, a 1-decene trimer. As can be seen from this figure, the boiling point distribution is centered at around about 419° C., and 40 wt % of the composition has a boiling point in the range of from 420° C. to 455° C. FIG. 4 above depicts the fraction of material boiling at different temperatures for a PAO that is formed form a cross oligomers of 1-Decene and 1-Dodecene with a C30 to C36 carbon range. As can be seen from FIG. 4, the boiling point distribution is centered at around about 428° C., and 57.5 wt % of the composition has a boiling point in the range of from 420° C. to 455° C.

Properties of C-14 Dimers

In one embodiment of the invention, increasing the reaction temperature of the 1-tetradecene oligomerization produces higher amounts of the desired tetradecene dimers, and improves the pour point. In particular, it has been discovered that physical properties of the dimer may be affected by the in-situ isomerization that may take place at increased temperatures of the BF3 reaction. The increased isomerization can be seen by measuring the branching ratio of the resulting 1-Tetradecene dimers. In one embodiment, increasing the branching ratio may yield 1-Tetradecene dimers with a relatively lower pour point. The branching ratio for an oligomer may be determined by calculating the ratio of Methyl (CH3) hydrogens to Methylene (CH2) hydrogens measured by Proton NMR. In one embodiment, the branching ratio is greater than 0.2. However, the branching ratio may also be less than 0.26 to achieve desired volatility. A temperature of the oligomerization process that may provide the branching ratio for the 1-Tetradecene dimer may be a temperature of at least 20° C., such as at least 60° C., and even at least 100° C., although the temperature may also be maintained less than 20° C. PAO compositions having reduced pour points may be advantageous for applications such as engine oils. In one embodiment, the PAO composition may have a pour point in the range of from −30 to −36, and even about −39° C., as measured by ASTM D97.

(TABLE 1) shows an example of the effect of reaction temperature and branching ratio on physical properties of C14 dimers

TABLE 1

| Reaction Temp (° C.) | KV40 (cSt) | KV100 (cSt) | VI | CCS@−30 C. | CCS@ −35 C. | Pour Point | NOACK (% loss) | Branching ratio |
|---|---|---|---|---|---|---|---|---|
| 19 | 12.69 | 3.30 | 134 | 402 | 688 | −30 | 16.0 | 0.215 |
| 60 | 13.27 | 3.36 | 130 | 441 | 740 | −36 | 17.6 | 0.260 |
| 80 | 13.78 | 3.40 | 122 | 509 | 831 | −39 | 19.0 | 0.271 |

When the 1-tetradecene dimer is blended with the 1-dodecene trimer, a bimodal distribution base fluid is made. Due to the bi-modal composition of the invention, it is possible to adjust the blend ratio of the C12 trimer and the C14 dimer enriched PAOs to maintain the desired viscosity with minimal effect on the CCS and Noack volatility, while also providing a decreased pour point, such that PAO compositions according to embodiments of the disclosure may be capable of passing SAE J300 low temperature viscosity requirements.

Properties of C12 Trimers

1-C12 trimers may be capable of providing an excellent 5 cSt base fluid. However, in some embodiments, 5 cSt is too viscous for lower weight engine oil formulations such as 0W-12. Accordingly, by blending with 1-C14 dimers it has advantageously been found that the viscosity can be reduced to yield a 4 cSt base fluid, while simultaneously maintaining improved cold flow and volatility properties, such as those described above.

In one embodiment, 1-C12 LAO oligomerization is carried out at low temperature to provide C12 trimers with a branching ratio of <0.2. A temperature of the oligomerization that may provide the branching ratio is a temperature of less than 20° C. The branching ratio results in a PAO composition with a relatively low CSS, a relatively high viscosity, and a relatively low noack volatility.

Furthermore, an average branching ratio for all 1-C12 and 1-C14 oligomers in the PAO composition may be in the range of from 0.19 to 0.26, with a preferred range of 0.2 to 0.23.

TABLE 2

| Dimer | Trimer | KV40 (cSt) | KV100 (cSt) | VI | CCS @ −30 C. | CCS @ −35 C. | Pour Point | Noack % loss | C14 Olig temp | Branching ratio | % Blended Dimer | % Blended Trimer |
|---|---|---|---|---|---|---|---|---|---|---|---|---|
| C14 | C12 | 18.64 | 4.26 | 139 | 813 | 1356 | −39 | 10.1 | 19 | 0.204 | 40% | 60% |
| C14 | C12 | 18.56 | 4.24 | 139 | 840 | 1410 | −39 | 11.4 | 60 | 0.222 | 43% | 57% |
| C14 | C12 | 18.60 | 4.23 | 136 | 867 | 1434 | −42 | 12.1 | 80 | 0.230 | 45% | 55% |

Accordingly, it has been surprisingly discovered that physical properties of commercially available 1-decene derived PAOs can be obtained by combining separately oligomerized C12 trimers and C14 dimers, as disclosed herein. PAOs made from LAOs longer than 1-decene typically have higher pour points but also advantageously may have a greater viscosity index. Furthermore, PAOs derived from long chain LAOs may have sub-optimal pour points, which can cause issues in the formulation of engine oils, as the base oil may greatly affect the formulation pour point. SAE J300 engine oil viscosity classification does not list a requirement for pour point. Instead the finished fluid typically must pass ASTM D4684 at −40° C. with no yield stress and a viscosity below 60,000 m Pas for a 0w-xx engine oil. To pass the 0W-xx requirement the formulation typically must flow at −40° C. A 1-decene based PAO has a pour point of −60° C. and a viscosity index of about 124. In contrast, aspects of the PAO composition comprising the C12 trimer and C14 dimers may be capable of providing a viscosity index above 130 by controlling the branching ratio of the mixture, while simultaneously maintaining a pour point below the −40° C. required to pass ASTM D4684 requirement for 0W-xx engine oils. Therefore, the PAO compositions according to embodiments of the present disclosure may be capable of exhibiting a marked improvement in viscosity index over PAOs based only on 1-decene.

Figure 5:
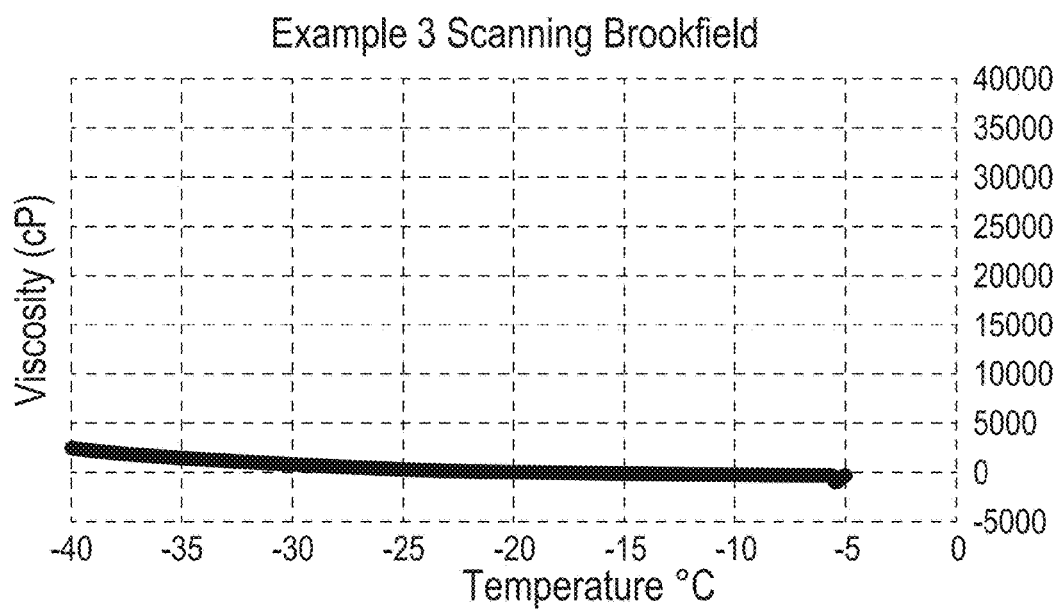
FIG. 5 illustrates a Scanning Brookfield gelation index, according to aspects of the disclosure.

Furthermore, ILSAC GF-5 and future ILSAC GF-6 engine oil certifications, will require a formulated engine oil to have a Scanning Brookfield gelation index (ASTM D5133) of less than 12 between the temperature range of −5° C. to −40° C. In embodiments of the disclosure, no detectable gelation index is found within the specified temperature range. (See, e.g., FIG. 5).

promoter preferably is a mixture of BF3 and BF3 promoted with a mixture of a normal alcohol and an acetate ester. The residence times may range from about 0.2 to about 4 hours, more typically about 0.75 to about 2.5 hours, the temperature will be about 20° C. to 105° C., and pressure will be about 3 to 6 psig. The reaction mixture from the final reactor is distilled to remove the unreacted monomers and catalyst adducts, which may be recovered and reused in some embodiments. The bottoms product is then hydrogenated to saturate oligomers. The product of individual 1-dodecene and 1-tetradecene oligomerizations may then be distilled from the hydrogenated bottoms and carefully blended to produce, in some embodiments, different grades of low viscosity PAO, which may also be mixed with the bottoms product after distillation to yield yet additional products.

In an embodiment of the invention, the reaction conditions of the 1-Tetradecene oligomerization are such that yield to dimer is 55% or greater and the yield to C12 trimer in the 1-Dodecene oligomerization is 55% or greater, where yield is calculated as a weight % of the total olefins that are fed into the oligomerization reaction.

The following examples are meant to illustrate embodiments of the present disclosure, and it will be recognized by one of ordinary skill in the art in possession that numerous modifications and variations are possible. Therefore, it is to be understood that embodiments of the invention may be practiced otherwise than as specifically described herein.

Example 1

In one embodiment of the present disclosure, 1-tetradecene is oligomerized using BF3 promoted by 10 mmols of butanol or BuOH (cocatalyst)/100 g hydrocarbon and 5

TABLE 3

| Sample | Monomer Feedstock | Olig Temp C. | CCS @ −35 C. | NOACK, % wt loss | KV100 (cSt) | VI | Pour Point |
|---|---|---|---|---|---|---|---|
| Commercial 4 cSt PAO Example A | 1-decene + 1-dodecene | | 1450 | 11 | 4.1 | 120 | −66 |
| Commercial 4 cSt PAO Example B | 1-decene | | 1191 | 13.4 | 3.9 | 124 | −68 |
| Example 1 | 1-dodecene + 1-tetradecene | 19/19 | 1356 | 10.1 | 4.268 | 139 | −39 |
| Example 2 | 1-dodecene + 1-tetradecene | 19/60 | 1410 | 11.4 | 4.25 | 138 | −39 |
| Example 3 | 1-dodecene + 1-tetradecene | 19/80 | 1434 | 12.1 | 4.235 | 136 | −42 |
| Commercial 4 cSt PAO Example C | 1-decene | 19 | 1290 | 11.2 | 3.9 | 126 | −60 max |
| Commercial 4 cSt PAO Example D | 1-decene | 19 | 1050 | 15.2 | 3.6 | 120 | −65 max |
| Commercial 5 cSt 5 cSt PAO | 1-dodecene | 19 | 2050 | 5.6 | 5.1 | 145 | −50 |
| Tetradecene dimer | 1-tetradecene | 19 | 688 | 16.0 | 3.31 | 134 | −30 |

In a one embodiment, the reaction is carried out in one or more continuously stirred tank reactors. The catalyst/dual mmols butyl acetate or BuAc (cocatalyst)/100 g hydrocarbon at a reaction temperature of 19° C. under semi-continuous reaction conditions. Premixed olefins and co-catalyst are fed into a 1 gallon stainless steel reactor over the course of 100 minutes. The reaction is continuously stirred and held for 80 minutes under 6 PSI of BF3 pressure. Reactants are pumped into a secondary quench vessel containing NaOH. A second reaction using 1-dodecene as the feed, which is oligomerized using BF3 promoted by 12.5 mmols of BuOH (cocatalyst)/100 g hydrocarbon and 2.5 mmols butyl acetate (cocatalyst)/100 g hydrocarbon at a reaction temperature of 19° C. using semi-continuous reaction conditions. The reaction is held for 80 minutes and quenched. Both reaction products are hydrogenated to <500 Br index separately, using standard conditions and catalyst for hydrogenating branched olefins to branched paraffins. The dimer of the 1-tetradecene product is removed from the remaining monomer and higher oligomers. The trimer of the 1-dodecene product is removed from the monomer, dimer, and higher oligomers. The 1-tetradecene dimers and 1-dodecene trimers are then blended in a 40:60 weight proportion to achieve a 4 cSt hydrogenated polyalphaolefin product.

Example 2

In one embodiment of the present disclosure, 1-tetradecene is oligomerized using BF3 promoted by 10 mmols of BuOH (cocatalyst)/100 g hydrocarbon and 5 mmols butyl acetate (cocatalyst)/100 g hydrocarbon at a reaction temperature of 80° C. under semicontinuous reaction conditions. Premixed olefins and co-catalyst are fed into a 1 gallon stainless steel reactor over the course of 100 minutes. The reaction is continuously stirred and held for 80 minutes under 6 PSI of BF3 pressure. Reactants are pumped into a secondary quench vessel containing NaOH. A second reaction using 1-dodecene as the feed is oligomerized using BF3 promoted by 12.5 mmols of BuOH and 2.5 mmols butyl acetate at a reaction temperature of 19° C. using semicontinuous reaction conditions. Reaction is held for 80 minutes and quenched. Both reaction products are hydrogenated to <500 Br index separately. The dimer of the 1-Tetradecene product is removed from the remaining monomer and higher oligomers. The trimer of the 1-dodecene product is removed from the monomer, dimer, and higher oligomers. The 1-tetradecene dimers and 1-dodecene trimers are then blended in a 55:45 weight proportion to achieve a 4 cSt hydrogenated polyalphaolefin product.

What is claimed is:

1. A polyalphaolefin (PAO) composition comprising a mixture of (i) a C12 trimer-enriched oligomer fraction of trimers of C12 alpha-olefins and (ii) a C14 dimer-enriched oligomer fraction of dimers of C14 alpha-olefins, where the ratio by weight of the C12 trimer-enriched oliqomer fraction to the C14 dimer-enriched oliqomer fraction in the PAO composition is within a range of 4:1 by weight to 1:4 by weight,
   where the C12 trimer-enriched oligomer fraction has an average branching ratio of <0.20 and the C14 dimer-enriched oliqomer fraction has an average branching ratio of >0.20, and where an average branching ratio for the mixture of the C12 trimer-enriched oligomer fraction and the C14 dimer-enriched oligomer fraction is between 0.19 and 0.26,
   where the PAO composition has a boiling point distribution where less than 30% by weight of the PAO composition has a boiling point between 420° C. and 455° C., and
   where the PAO composition has a kinematic viscosity of about 3.8 to 4.3 cSt at 100° C., and a Noack volatility between 10-13%.

2. The composition of claim 1, wherein
   (i) less than 25% by weight of the composition, or
   (ii) less than 20% by weight of the composition, or
   (iii) less than 15% by weight of the composition,
   has the boiling point in the range of 420 to 455° C.

3. The composition of claim 1 having a Cold cracking viscosity (CCS) between 1000-1500 Centipoise.

4. The composition of claim 1, comprising
   i) less than 30 wt % trimers containing a 1-decene monomer unit,
   ii) less than 20 wt % trimers containing a 1-decene monomer unit,
   iii) less than 15 wt % trimers containing a 1-decene monomer unit,
   iv) less than 10 wt % trimers containing a 1-decene monomer unit,
   v) less than 5 wt % trimers containing a 1-decene monomer unit, or
   vi) less than 1 wt % trimers containing a 1-decene monomer unit.

5. The composition of claim 1, wherein the ratio of the C12 trimer-enriched oligomer fraction to the C14 dimer-enriched oligomer fraction dimer is
   i) within a range of 3:1 to 1:3 by weight,
   ii) within a range of 2:1 to 1:2 by weight, or
   iii) within a range of 1.5:1 to 1:1.5 by weight.

6. A process for preparing a lubricant base oil comprising the steps of (a) acid catalyzed oligomerization of one or more alpha-olefins comprising a 1st olefin feedstock that has an average carbon length of 12 to form a 1st polyalphaolefin oligomer (1-Dodecene oligomerization); (b) distilling the 1st polyalphaolefin oligomer to recover a trimer-enriched oligomer fraction (1-C12 trimer); (c) acid catalyzed oligomerization of one or more alpha-olefins comprising a 2nd olefin feedstock that has an average carbon length of 14 to form a 2nd polyalphaolefin oligomer (1-Tetradecene oligomerization); (d) distilling the 2nd polyalphaolefin oligomer to recover a dimer-enriched oligomer fraction (1-C14 dimer); (e) blending the dimer- and trimer-enriched fractions from the 1st and 2nd polyalphaolefin oligomers to form a lubricant base oil product; and (f) hydrogenating the product before or after blending.

7. The process of claim 6 where the 1-Tetradecene oligomerization is carried out at a reaction temperature of
   i) 19-100° C.,
   ii) 30-95° C.,
   iii) 40-90° C.,
   iv) 40-85° C.,
   v) 50-80° C.,
   vi) 70-78° C., or
   vii) 72-76° C.

8. The process of claim 6 where the 1-Dodecene oligomerization is carried out at a reaction temperature of
   i) 10-100° C.,
   ii) 11-90° C.,
   iii) 12-80° C.,
   iv) 13-70° C.,
   v) 14-60° C.,
   vi) 15-50° C.,
   vii) 16-40° C.,
   viii 17-30° C., or
   ix) 18-25° C.

9. The process of claim 6, further comprising performing the oligomerization of step (a) and/or (c) at a temperature that causes isomerization of the respective 1st olefin feedstock and/or $2^{nd}$ olefin feedstock.

10. The process of claim 6, further comprising isomerizing the respective 1st olefin feedstock and/or $2^{nd}$ olefin feedstock prior to the oligomerization of step (a) and/or (c).

11. The process of claim 6, wherein the 1st olefin feedstock is oligomerized under conditions that provide a C12 trimer-enriched oligomer fraction having a branching ratio of <0.20 and the $2^{nd}$ olefin feedstock is oligomerized under conditions that provide a C14 dimer-enriched oligomer fraction having a branching ratio of >0.20.

12. The process of claim 6 where the oligomerization of step (a) and/or (c) is catalyzed by $BF_3$ with an alcohol and/or ester promoter.

13. The process of claim 6 where the yield of 1-C12 trimer is >55%.

14. The process of claim 6 where the yield of 1-C14 dimer is >55%.

15. The process of claim 6 where the oligomers of 1-C12 and 1-C14 are hydrogenated and distilled and the distillates are blended to produce a product with a viscosity at 100° C. of 3.5-4.7 cSt, and the bottoms are blended to produce a heavier product with viscosity at 100° C. of 6 to 12 cSt.

16. The process of claim 6 in which the C12 trimer-enriched oligomer fraction has a branching ratio of <0.20 and the C14 dimer-enriched oligomer fraction has a branching ratio of >0.20.

17. The process of claim 15 in which the bottoms are blended to produce a heavier product with viscosity at 100° C. of 7 to 10 cSt.

18. The process of claim 6 where a 1-C14 LAO (linear alpha-olefin) is isomerized to form an internal olefin prior to the oligomerization of step (c).

19. The process of claim 6 wherein the resulting base oil boiling point distribution has less than 30% of total oligomers boil between 420° C. and 455° C.; and most preferred <15% of total oligomers boil between 420° C. and 455° C. where the resulting base oil has a kinematic viscosity of about 3.3 to 4.7 cSt at 100° C.

20. The process according to claim 19 wherein the resulting base oil has a kinematic viscosity at 100° C. of 3.3-4.7 Centistokes, a Noack volatility between 5-19%, and a −35° C. Cold-cranking viscosity (CCS) of 650-2100 Centipoise.

21. The process according to claim 19 wherein the resulting base oil has a kinematic viscosity at 100° C. of 3.8-4.3 Centistokes, a Noack volatility between 10-13%, and a −35° C. Cold-cranking viscosity (CCS) of 1100-1500 Centipoise.

22. A lubricant mixture comprising the PAO composition of claim 1.

23. The lubricant mixture according to claim 22 wherein the PAO composition comprises from 1 to 90 wt % of an engine oil formulation.

24. A lubricant mixture comprising from 1-99% by weight of the product prepared according to the process of claim 6, the resulting oil mixture having a viscosity index of greater than 125, a Noack volatility of <14% and CCS <1500 Centipoise at −35° C.

\* \* \* \* \*